United States Patent
Harnish et al.

(10) Patent No.: US 9,134,948 B1
(45) Date of Patent: Sep. 15, 2015

(54) METHOD AND SYSTEM FOR DETECTING AND SERVING HIGH-RESOLUTION IMAGES TO HIGH-RESOLUTION DEVICES

(71) Applicant: GOOGLE INC., Mountain View, CA (US)

(72) Inventors: Phil Thayne Harnish, Mountain View, CA (US); Daniel John Auclair, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 44 days.

(21) Appl. No.: 14/103,591

(22) Filed: Dec. 11, 2013

(51) Int. Cl.
　　*G06K 9/60* (2006.01)
　　*G06F 3/14* (2006.01)

(52) U.S. Cl.
　　CPC .................... *G06F 3/1415* (2013.01)

(58) Field of Classification Search
　　CPC ....... G09G 3/3413; G09G 5/02; G02B 5/201; G02F 1/133514; G02F 1/136213; G02F 1/136286
　　USPC ......................................................... 382/305
　　See application file for complete search history.

(56) References Cited

U.S. PATENT DOCUMENTS

| | | |
|---|---|---|
| 8,185,591 B1 | 5/2012 | Lewis |
| 2002/0021758 A1* | 2/2002 | Chui ........................ 375/240.19 |
| 2003/0133054 A1* | 7/2003 | Taguchi et al. ................. 349/38 |
| 2013/0141456 A1 | 6/2013 | Sokolov et al. |
| 2013/0219024 A1 | 8/2013 | Flack |
| 2013/0219263 A1 | 8/2013 | Abrahami |

* cited by examiner

*Primary Examiner* — Ali Bayat
(74) *Attorney, Agent, or Firm* — Birch, Stewart, Kolasch & Birch, LLP (57) ABSTRACT

Provided are methods and systems for generating multiple versions of an image and providing the appropriate version of the image to a user device based on a display characteristic of the user device. If a higher-resolution source version of an image exists in the sprite directory, that higher-resolution version of the image is built into a mixed-resolution sprite sheet rather than a standard-resolution sprite sheet. A Device-Pixel-Ratio for a user device is utilized when determining the appropriate version of an image to send to the device, where the Device-Pixel-Ratio is defined as the ratio between physical pixels and device-independent pixels (dips) of a display of the device. If the Device-Pixel-Ratio is equal to or greater than a threshold value, a high-resolution version of an image (if one is available) is sent to the user device. Otherwise, the standard-resolution version of the image is sent to the user device.

20 Claims, 6 Drawing Sheets

METHOD AND SYSTEM FOR DETECTING AND SERVING HIGH-RESOLUTION IMAGES TO HIGH-RESOLUTION DEVICES

BACKGROUND

High-resolution devices (e.g., devices with a display density of at least 240 dots per inch (DPI)) are becoming more common. However, existing approaches for deploying high-resolution images are often overly complex and/or involve high costs to developers.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for providing digital content to users. More specifically, aspects of the present disclosure relate to identifying multiple versions of an image (e.g., where different versions of the image have different resolutions) and providing the appropriate version of the image to a user device based on one or more display characteristics of the user device.

One embodiment of the present disclosure relates to a computer-implemented method comprising: selecting an image out a plurality of images available for display on user devices, wherein the selected image is of a first resolution; determining that another version of the selected image is available, wherein the other version of the selected image is of a second resolution higher than the first resolution; updating the plurality of images available for display on user devices by adding the other version of the selected image to the plurality of images; generating a file containing instructions for displaying the updated plurality of images; and providing to a user device the file containing instructions and either the selected image or the other version of the selected image based on one or more display characteristics of the user device.

In another embodiment, the computer-implemented method further comprises: determining the ratio of physical pixels to device-independent pixels of the display of the user device, and providing, to the user device, the file containing instructions and either the selected image or the other version of the selected image based on a comparison of the ratio of physical pixels to device-independent pixels of the display of the user device to a predetermined threshold value.

In another embodiment, the computer-implemented method further comprises: determining, based on the comparison, that the ratio of physical pixels to device-independent pixels of the display of the user device is less than the predetermined threshold value, and providing, to the user device, the file containing instructions and the selected image.

In another embodiment, the computer-implemented method further comprises: determining, based on the comparison, that the ratio of physical pixels to device-independent pixels of the display of the user device is equal to or greater than the predetermined threshold value; and providing, to the user device, the file containing instructions and the other version of the selected image.

Another embodiment of the present disclosure relates to a system comprising one or more processors and a non-transitory computer-readable medium coupled to the one or more processors having instructions stored thereon that, when executed by the one or more processors, cause the one or more processors to perform operations comprising: selecting an image out a plurality of images available for display on user devices, wherein the selected image is of a first resolution; determining that another version of the selected image is available, wherein the other version of the selected image is of a second resolution higher than the first resolution; updating the plurality of images available for display on user devices by adding the other version of the selected image to the plurality of images; generating a file containing instructions for displaying the updated plurality of images; and providing to a user device the file containing instructions and either the selected image or the other version of the selected image based on one or more display characteristics of the user device.

In another embodiment, the one or more processors of the system are caused to perform further operations comprising: determining the ratio of physical pixels to device-independent pixels of the display of the user device; and providing, to the user device, the file containing instructions and either the selected image or the other version of the selected image based on a comparison of the ratio of physical pixels to device-independent pixels of the display of the user device to a predetermined threshold value.

In yet another embodiment, the one or more processors of the system are caused to perform further operations comprising: determining, based on the comparison, that the ratio of physical pixels to device-independent pixels of the display of the user device is less than the predetermined threshold value; and providing, to the user device, the file containing instructions and the selected image.

In still another embodiment, the one or more processors of the system are caused to perform further operations comprising: determining, based on the comparison, that the ratio of physical pixels to device-independent pixels of the display of the user device is equal to or greater than the predetermined threshold value; and providing, to the user device, the file containing instructions and the other version of the selected image.

Yet another embodiment of the present disclosure relates to one or more non-transitory computer readable media storing computer-executable instructions that, when executed by one or more processors, cause the one or more processors to perform operations comprising: selecting an image out a plurality of images available for display on user devices, wherein the selected image is of a first resolution; determining that another version of the selected image is available, wherein the other version of the selected image is of a second resolution higher than the first resolution; updating the plurality of images available for display on user devices by adding the other version of the selected image to the plurality of images; generating a file containing instructions for displaying the updated plurality of images; and providing to a user device the file containing instructions and either the selected image or the other version of the selected image based on one or more display characteristics of the user device.

In one or more other embodiments, the methods and systems described herein may optionally include one or more of the following additional features: the one or more display characteristics of the user device includes a ratio of physical pixels to device-independent pixels of a display of the user device; the predetermined threshold value is 1; the file containing instructions for displaying the updated plurality of images is a cascading style sheet file; and/or the plurality of images is a sprite sheet of the plurality of images.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

Embodiments of the present disclosure relate to methods and systems for identifying multiple versions of an image (e.g., a standard-resolution (e.g., 72 pixels per inch (PPI)) version of the image and a higher-resolution (e.g., 120 PPI) version of the image) and providing the appropriate version of the image to a user device based on one or more display characteristics of the user device. In accordance with at least one embodiment, the one or more display characteristics of the user device may include a resolution (e.g., DPI, PPI, etc.) of a display of the user device. As will be described in greater detail below, the methods and systems presented may determine whether a higher-resolution source version of an image exists in the sprite directory, and if so, that higher-resolution version of the image may be built into a mixed-resolution sprite sheet rather than a standard-resolution sprite sheet. Further, the methods and systems of the present disclosure may be automated such that the cost to developers for adding and/or removing (e.g., to/from their website) high-resolution versions of images is significantly lowered.

In accordance with one or more embodiments, the techniques described herein may utilize a Device-Pixel-Ratio when determining the appropriate version of an image to send to a user device, where the Device-Pixel-Ratio may be defined as the ratio between physical pixels and device-independent pixels (dips) on the device. For example, if the Device-Pixel-Ratio for a particular user device is determined to be equal to or greater than some predetermined threshold value (e.g., 1, 2, etc.), a high-resolution version of an image may be sent to that user device. On the other hand, if the Device-Pixel-Ratio for the user device is determined to be less than the predetermined threshold value, the user device may instead receive a standard-resolution version of the image.

In accordance with at least one embodiment, the system described herein may be configured to generate and serve multiple cascading style sheet (CSS) files and/or multiple image files (also sometimes referred to herein as "sprite sheets" or "sprite files") based on the particular display capabilities of the user's device. It should be noted that some images (e.g., graphical objects, icons, logos, symbols, etc.) may not have a high-resolution counterpart version. As such, in accordance with at least one embodiment, an individual sprite file may include a mix of standard-resolution and high-resolution images.

One existing approach to serving both high-resolution and standard-resolution images includes utilizing a single CSS file with complex syntax for selecting between multiple images. One potential problem with such an approach is that a large amount of duplicated code ("boilerplate" code) is needed each time an image is used. Also, such an approach is difficult to use with sprite sheets since the parameters of the CSS file (e.g., x/y/width/height parameters) differ from those of a sprite sheet.

As will be described in greater detail herein, the systems and methods of the present disclosure may improve the quality (e.g., visual or aesthetic quality) of a website's appearance on high-resolution devices. The systems and processes described herein are designed as low-maintenance and allow for richer content to be provided.

Figure 1:
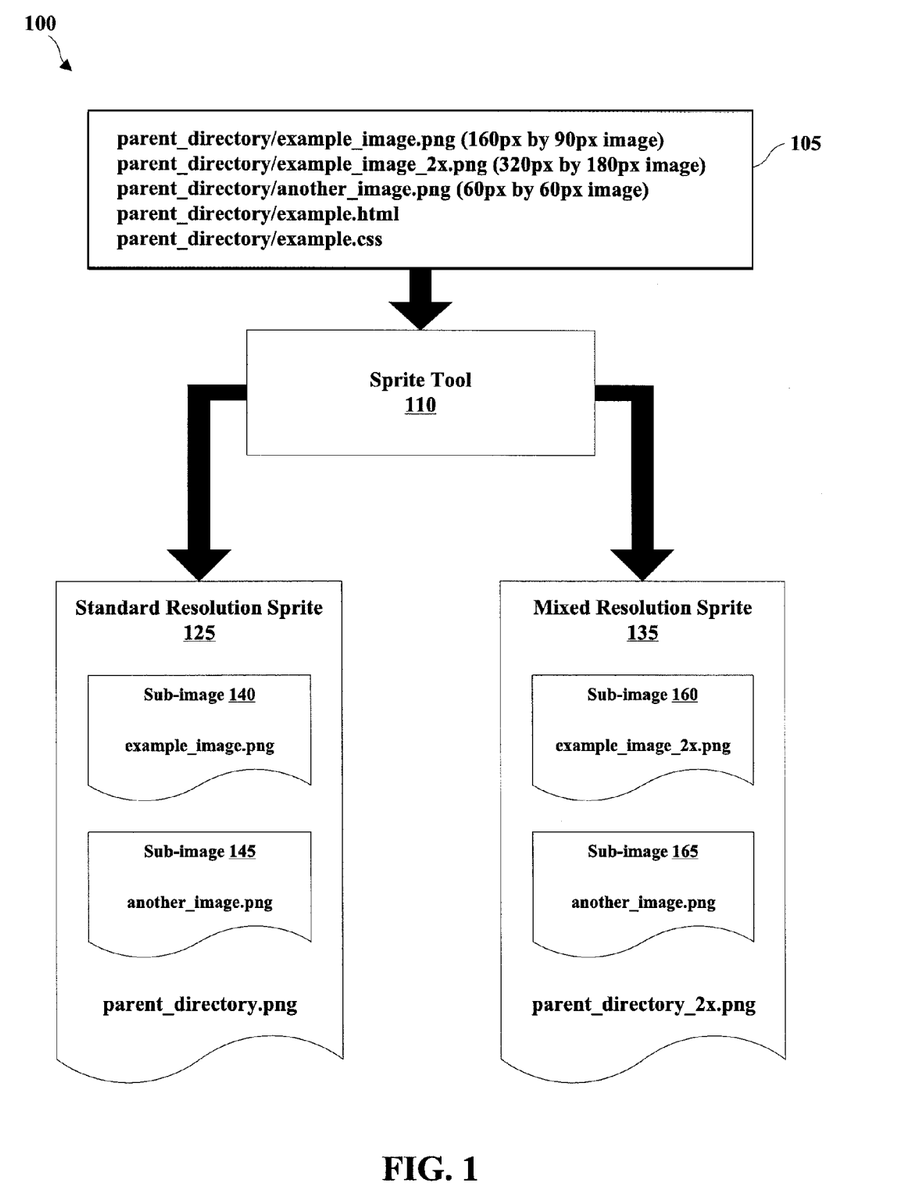
FIG. 1 is a block diagram illustrating an example system for identifying images of different resolutions according to one or more embodiments described herein.

FIG. 1 illustrates an example system for identifying images of different resolutions according to one or more embodiments described herein. In accordance with at least one embodiment, the system 100 may include a list of files 105 and a Sprite Tool 110. The system 100 may operate to provide, as output, standard resolution sprite 125 and mixed resolution sprite 135.

The files 105 may all be available in "parent_directory" and may include, for example, portable network graphics (PNG) files "example_image.png", "example_image_2x .png", and "another_image.png", HyperText Markup Language (HTML) file "example.html", and CSS file "example.css". It should be understood that the contents of files 105 may differ in one or more respects from one scenario to the next. For example, in a scenario where a 2× resolution version of "example_image.png" is not available, files 105 may not include a file such as "example_image__2×.png". Similarly, in a scenario where a 2× resolution version of "another_image.png" is available, files 105 may include an additional file such as "another_image__2×.png".

In accordance with at least one embodiment, Sprite Tool 110 may be a program (e.g., computer software program or application) configured to assemble (e.g., combine) the images contained in files 105 into a single image. For example, Sprite Tool 110 may be configured to assemble "example_image.png" and "another_image.png" into standard resolution sprite 125. Standard resolution sprite 125 may be an assembled image composed of 1× resolution sub-images 140 and 145 (e.g., "example_image.png" and "another_image.png", respectively). In another example, Sprite Tool 110 may be configured to assemble "example_image__2×.png" and "another_image.png" into mixed resolution sprite 135. Mixed resolution sprite 135 may be an assembled image composed of a 2× resolution sub-image 160 (e.g., "example_image__2×.png") and a 1× resolution sub-image 165 (e.g., "another_image.png").

In at least one embodiment described herein, Sprite Tool 110 may also be configured to define (e.g., calculate, determine, etc.) one or more constant values for the assembled images (e.g., standard resolution sprite 125 and/or mixed resolution sprite 135). As will be described in greater detail below, Sprite Tool 110 may be configured to define, for example, a total size of the combined image (e.g., TOTAL_SPRITE_WIDTH in the CSS constant values 210 in the example system 200 shown in FIG. 2).

Figure 2:
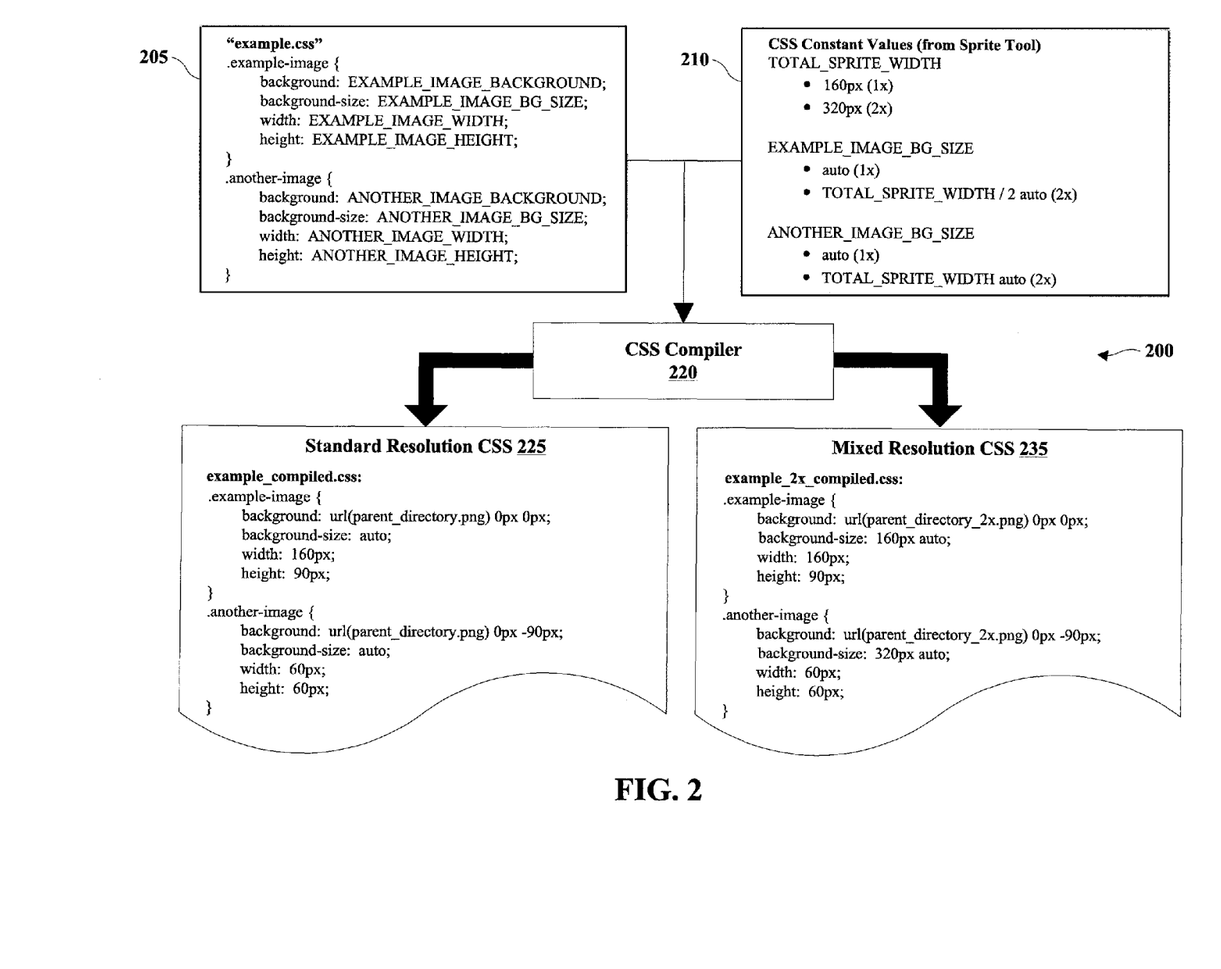
FIG. 2 is a block diagram illustrating an example system for generating files containing instructions for displaying images of different resolutions according to one or more embodiments described herein.

FIG. 2 illustrates an example system for generating files containing instructions for displaying images of different resolutions according to one or more embodiments described herein. In accordance with at least one embodiment, the system 200 may include source CSS file 205, CSS Compiler 220, and one or more CSS constant values 210. The system 200 may be operate to generate or provide, as output, for example, standard resolution CSS file 225 and mixed resolution CSS file 235.

The source CSS file 205 may be a file that is authored by a developer who wishes to use the images contained therein (e.g., "example-image" and "another-image"). In authoring the source CSS file 205, a developer may use one or more CSS constant values 210 including, for example, TOTAL_SPRITE_WIDTH, which may be a total size of the combined image. In accordance with at least one embodiment, the CSS constant values 210 may be determined by a Sprite Tool (e.g., Sprite Tool 140 in the example system 100 shown in FIG. 1).

CSS Compiler 220 may be a program (e.g., computer software program or application) configured to perform various calculations using the source CSS file 205 and constant values 210 to generate (e.g., assemble, combine, etc.) standard resolution CSS file 225 and mixed resolution CSS file 235. The standard resolution CSS file 225 generated by CSS Compiler 220 may reference a corresponding standard resolution sprite while the mixed resolution CSS file 235 may reference a corresponding mixed resolution sprite (e.g., standard resolution sprite 125 and mixed resolution sprite 135 in the example system 100 shown in FIG. 1).

Figure 3:
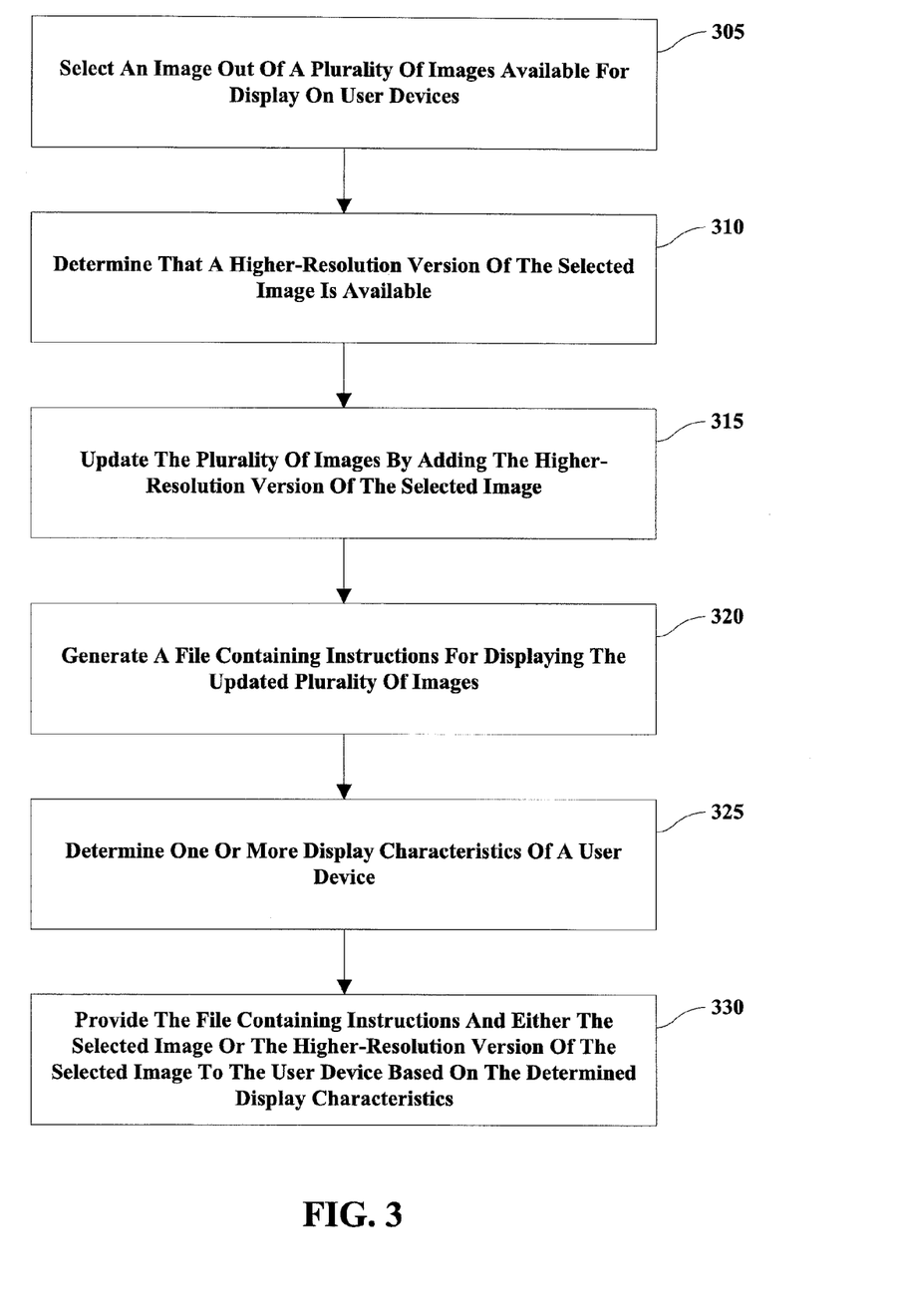
FIG. 3 is a flowchart illustrating an example method for identifying multiple versions of an image and providing the appropriate version of the image to a user device based on one or more display characteristics of the of the device according to one or more embodiments described herein.

FIG. 3 illustrates an example process for identifying multiple versions of an image and providing the appropriate version of the image to a user device based on one or more display characteristics of the of the device according to one or more embodiments described herein.

At block 305, a selection of an image may be received, where the image is selected from a plurality of images available for display on user devices. For example, a selection of an image (e.g., "example_image.png" from files 105 in the example system 100 shown in FIG. 1) may be received from a developer who wishes to add the particular image to his or her website.

At block 310, it may be determined that a higher-resolution (e.g., 2× resolution, high-DPI, etc.) version of the image selected at block 305 is available. In accordance with at least one embodiment, the higher-resolution source version of the selected image may be determined to exist in a corresponding sprite directory. For example, where a selection of "example_image.png" is received at block 305, it may be determined at block 310 that "example_image__2×.png" (a higher-resolution version of "example_image.png") is available in the sprite directory.

At block 315, the plurality of images available for display on user devices may be updated by adding the higher-resolution version of the selected image determined to be available at block 310. For example, where a higher-resolution version of the selected image is found to exist at block 310, then at block 315 that higher-resolution version of the image may be built into a mixed-resolution sprite sheet rather than a standard-resolution sprite sheet (e.g., mixed resolution sprite 135 instead of standard resolution sprite 125 in the example system 100 shown in FIG. 1).

At block 320, a file containing instructions for displaying the updated plurality of images may be generated. In accordance with at least one embodiment, a program may be configured to generate a standard resolution CSS file, a mixed resolution CSS file, or both, using a source CSS file and one or more CSS constant values (e.g., CSS Compiler 220 configured to generate standard resolution CSS file 225 and/or mixed resolution CSS file 235 using source CSS file 205 and one or more CSS constant values 210 in the example system 200 shown in FIG. 2).

At block 325, one or more display characteristics of a particular user device may be determined. In accordance with at least one embodiment, the one or more display characteristics of the user device may include a resolution (e.g., DPI, PPI, etc.) of a display of the user device. For example, at block 325 a Device-Pixel-Ratio (e.g., the ratio between physical pixels and device-independent pixels (dips)) may be determined or calculated for the particular user device.

At block 330, the file containing instructions generated at block 325, along with either the (standard-resolution) image selected at block 305 or the higher-resolution version of the image determined to exist at block 310, may be provided to the user device based on the one or more display characteristics of the user device determined at block 325. For example, in accordance with at least one embodiment, if the Device-Pixel-Ratio for the user device (calculated or identified at block 325) is determined to be equal to or greater than some predetermined threshold value (e.g., 1, 2, etc.), the higher-resolution version of the selected image (in the case where such a higher-resolution version of the image is available) may be provided to the user device at block 330. On the other hand, if the Device-Pixel-Ratio for the user device is determined to be less than the predetermined threshold value, the user device may instead be provided with the standard-resolution version of the image at block 330.

Figure 4:
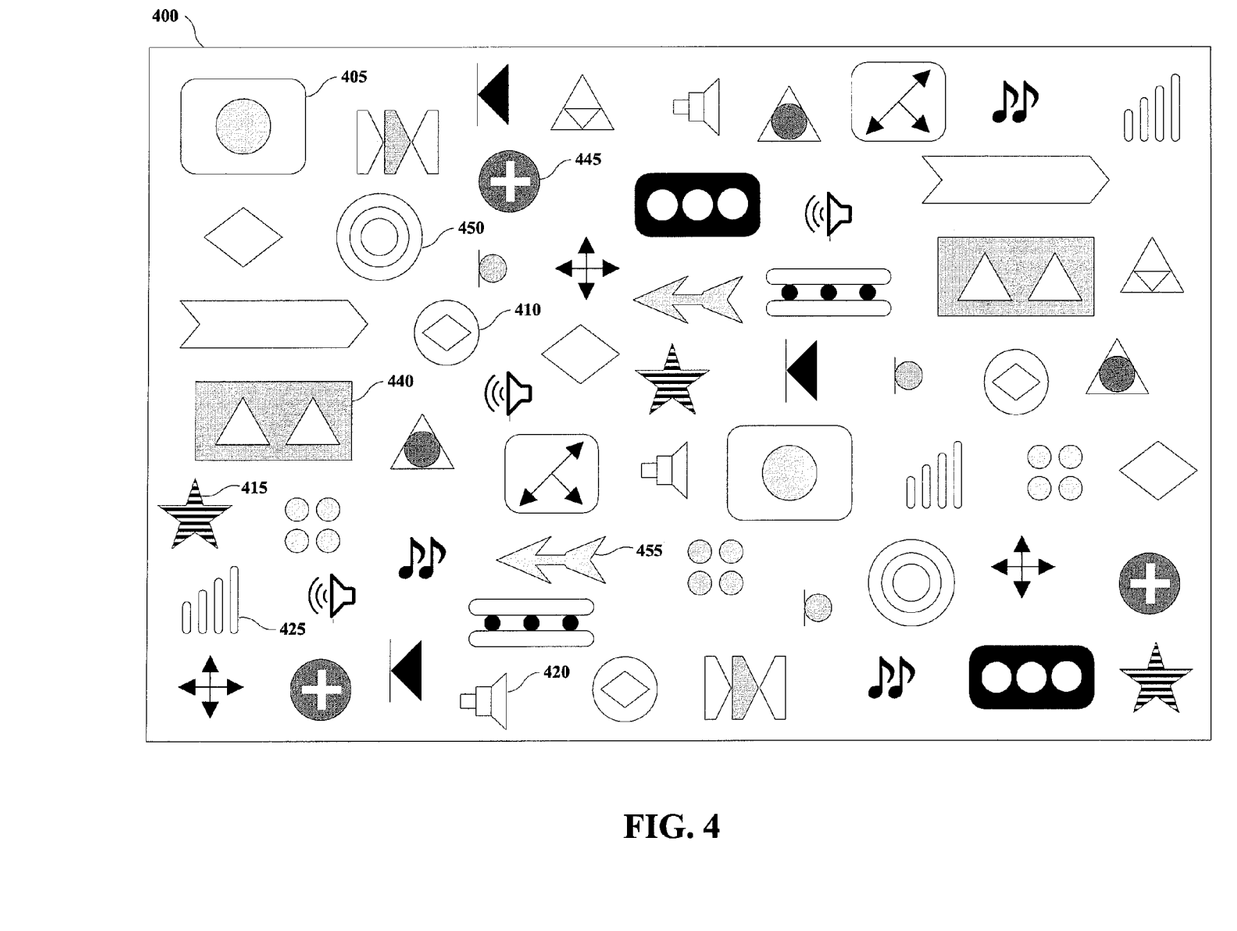
FIG. 4 is schematic diagram illustrating an example sprite sheet of multiple images according to one or more embodiments described herein.

FIG. 4 illustrates an example sprite sheet including multiple sprites (e.g., images, graphical objects, icons, etc.). FIG.

Figure 5:
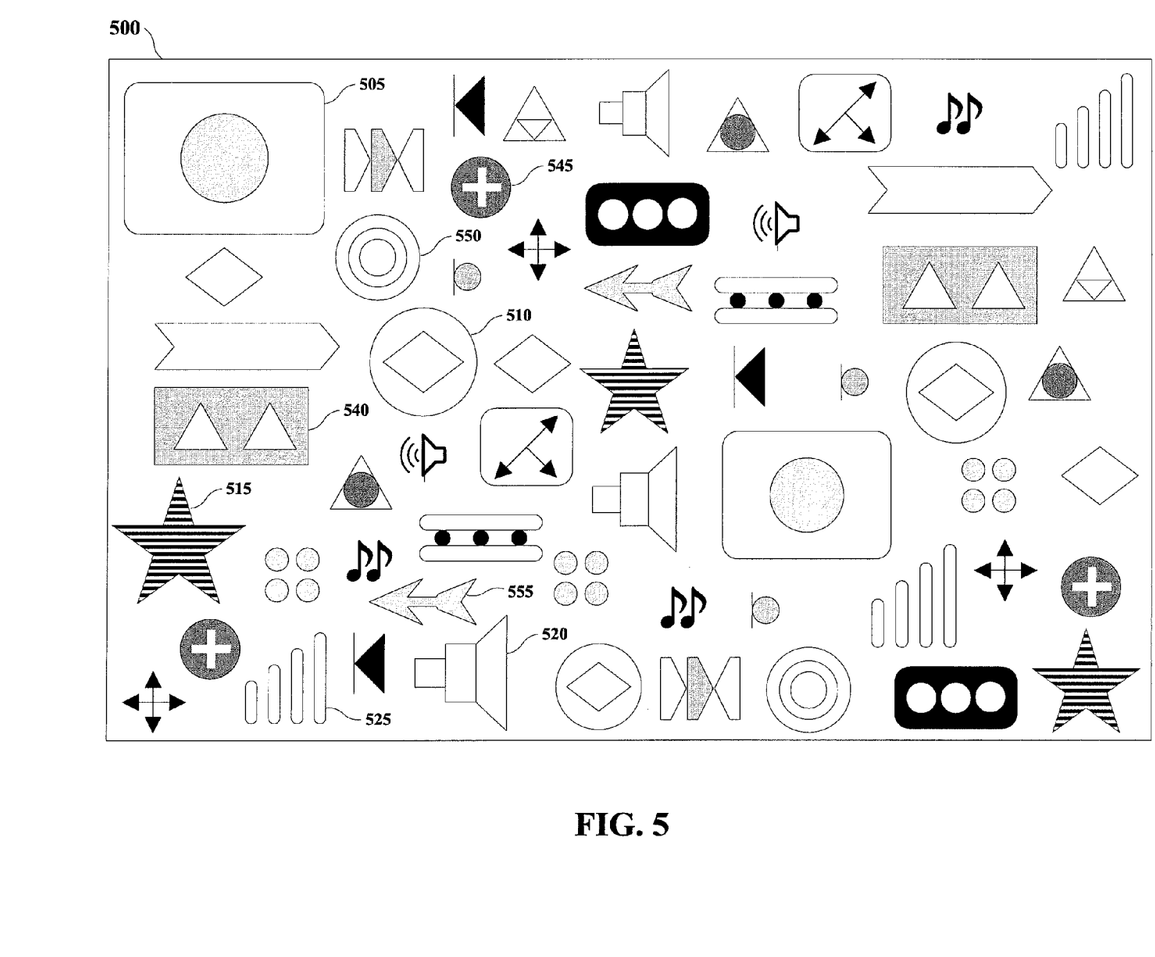
FIG. 5 is schematic diagram illustrating another example sprite sheet of multiple images, where some of the images are larger versions of the images included in the example sprite sheet shown in FIG. 4, according to one or more embodiments described herein.

5 illustrates another example sprite sheet including multiple images, where some (but not all) of the images are larger versions of the images included in the example sprite sheet shown in FIG. 4. For example, images 505, 510, 515, 520, and 525 shown in the example sprite sheet 500 of FIG. 5 are larger versions of images 405, 410, 415, 420, and 425 shown in the example sprite sheet 400 of FIG. 4. On the other hand, images 540, 545, 550, and 555 shown in the example sprite sheet 500 of FIG. 5 are the same as images 440, 445, 450, and 455 shown in the example sprite sheet 400 of FIG. 4. As such, any one or more of images 440, 445, 450, and 455 may appear lower in quality on a high-resolution device as compared to any one or more of images 505, 510, 515, 520, and 525 on the same high-resolution device.

In accordance with one or more embodiments described herein, higher-resolution images may be used in a sprite scaled properly for high-resolution devices with the background-size CSS property described above.

Figure 6:
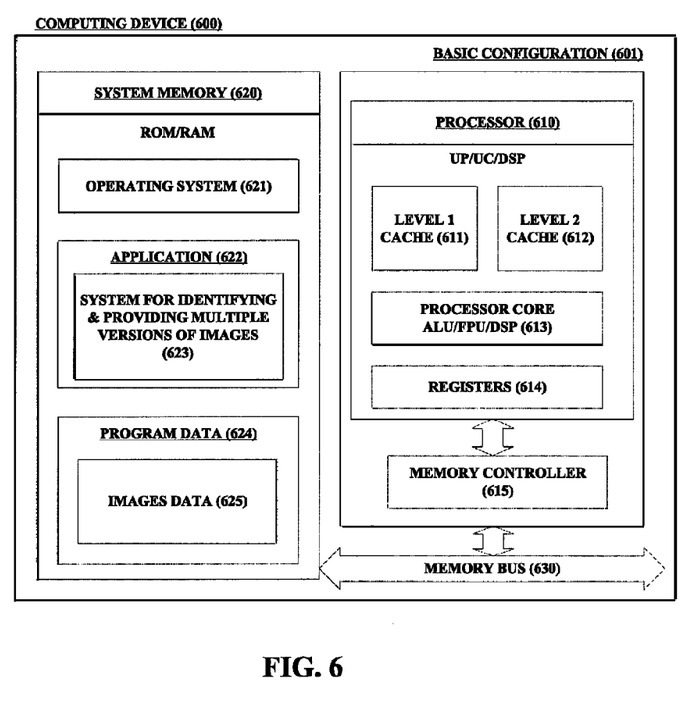
FIG. 6 is a block diagram illustrating an example computing device arranged for identifying multiple versions of an image and providing the appropriate version of the image to a user device based on one or more display characteristics of the of the device according to one or more embodiments described herein.

FIG. 6 is a high-level block diagram of an exemplary computer (600) that is arranged for generating multiple versions of an image and providing the appropriate version of the image to a user device based on one or more display characteristics of the of the device, in accordance with one or more embodiments described herein. In a very basic configuration (601), the computing device (600) typically includes one or more processors (610) and system memory (620). A memory bus (630) can be used for communicating between the processor (610) and the system memory (620).

Depending on the desired configuration, the processor (610) can be of any type including but not limited to a microprocessor (µP), a microcontroller (µC), a digital signal processor (DSP), or any combination thereof. The processor (610) can include one more levels of caching, such as a level one cache (611) and a level two cache (612), a processor core (613), and registers (614). The processor core (613) can include an arithmetic logic unit (ALU), a floating point unit (FPU), a digital signal processing core (DSP Core), or any combination thereof. A memory controller (616) can also be used with the processor (610), or in some implementations the memory controller (615) can be an internal part of the processor (610).

Depending on the desired configuration, the system memory (620) can be of any type including but not limited to volatile memory (such as RAM), non-volatile memory (such as ROM, flash memory, etc.) or any combination thereof. System memory (620) typically includes an operating system (621), one or more applications (622), and program data (624). The application (622) may include a system for generating multiple versions of an image (e.g., image versions of different resolutions) and providing the appropriate version of the image to a user device based on one or more display characteristics (e.g., a resolution of the display) of the user device. Program Data (624) may include storing instructions that, when executed by the one or more processing devices, implement a system and method for generating multiple versions of an image and providing one of the versions of the image to a user device based on a determined display capability (e.g., resolution) of the user device. Additionally, in accordance with at least one embodiment, program data (624) may include image data (625), which may relate to resolutions of images currently available for display on, for example, a website. In some embodiments, the application (622) can be arranged to operate with program data (624) on an operating system (621).

The computing device (600) can have additional features or functionality, and additional interfaces to facilitate communications between the basic configuration (601) and any required devices and interfaces.

System memory (620) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of the device (600).

The computing device (600) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (600) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs miming on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location).

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
   selecting an image out a plurality of images available for display on user devices, wherein the selected image is of a first resolution;
   determining that another version of the selected image is available, wherein the other version of the selected image is of a second resolution higher than the first resolution;
   updating the plurality of images available for display on user devices by adding the other version of the selected image to the plurality of images;
   generating a file containing instructions for displaying the updated plurality of images;
   determining a ratio of physical pixels to device-independent pixels of a display of a user device; and
   providing to the user device the file containing instructions and either the selected image or the other version of the selected image based on a comparison of the ratio of physical pixels to device-independent pixels of the display of the user device to a predetermined threshold value.

2. The computer-implemented method of claim 1, wherein the second resolution is twice the first resolution.

3. The computer-implemented method of claim 1, further comprising:
   comparing the ratio of physical pixels to device-independent pixels of the display of the user device.

4. The computer-implemented method of claim 3, further comprising:
   determining, based on the comparison, that the ratio of physical pixels to device-independent pixels of the display of the user device is less than the predetermined threshold value; and
   providing, to the user device, the file containing instructions and the selected image.

5. The computer-implemented method of claim 3, further comprising:
   determining, based on the comparison, that the ratio of physical pixels to device-independent pixels of the display of the user device is equal to or greater than the predetermined threshold value; and
   providing, to the user device, the file containing instructions and the other version of the selected image.

6. The computer-implemented method of claim 1, wherein the predetermined threshold value is 1.

7. The computer-implemented method of claim 1, wherein the file containing instructions for displaying the updated plurality of images is a cascading style sheet file.

8. The computer-implemented method of claim 1, wherein the plurality of images is a sprite sheet of the plurality of images.

9. A system comprising:
   one or more processors; and
   a non-transitory computer-readable medium coupled to said one or more processors having instructions stored thereon that, when executed by said one or more processors, cause said one or more processors to perform operations comprising:
      selecting an image out a plurality of images available for display on user devices, wherein the selected image is of a first resolution;
      determining that another version of the selected image is available, wherein the other version of the selected image is of a second resolution higher than the first resolution;
      updating the plurality of images available for display on user devices by adding the other version of the selected image to the plurality of images;
      generating a file containing instructions for displaying the updated plurality of images;
      determining a ratio of physical pixels to device-independent pixels of a display of a user device; and
      providing to the user device the file containing instructions and either the selected image or the other version of the selected image based on a comparison of the ratio of physical pixels to device-independent pixels of the display of the user device to a predetermined threshold value.

10. The system of claim 9, wherein the second resolution is twice the first resolution.

11. The system of claim 9, wherein the one or more processors are caused to perform further operations comprising:
    comparing the ratio of physical pixels to device-independent pixels of the display of the user device.

12. The system of claim 11, wherein the one or more processors are caused to perform further operations comprising:
    determining, based on the comparison, that the ratio of physical pixels to device-independent pixels of the display of the user device is less than the predetermined threshold value; and
    providing, to the user device, the file containing instructions and the selected image.

13. The system of claim 11, wherein the one or more processors are caused to perform further operations comprising:
    determining, based on the comparison, that the ratio of physical pixels to device-independent pixels of the display of the user device is equal to or greater than the predetermined threshold value; and
    providing, to the user device, the file containing instructions and the other version of the selected image.

14. The system of claim 9, wherein the predetermined threshold value is 1.

15. The system of claim 9, wherein the file containing instructions for displaying the updated plurality of images is a cascading style sheet file.

16. The system of claim 9, wherein the plurality of images is a sprite sheet of the plurality of images.

17. One or more non-transitory computer readable media storing computer-executable instructions that, when executed by one or more processors, cause the one or more processors to perform operations comprising:
    selecting an image out a plurality of images available for display on user devices, wherein the selected image is of a first resolution;
    determining that another version of the selected image is available, wherein the other version of the selected image is of a second resolution higher than the first resolution;

updating the plurality of images available for display on user devices by adding the other version of the selected image to the plurality of images;

generating a file containing instructions for displaying the updated plurality of images;

determining a ratio of physical pixels to device-independent pixels of a display of a user device; and providing to the user device the file containing instructions and either the selected image or the other version of the selected image based on a comparison of the ratio of physical pixels to device-independent pixels of the display of the user device to a predetermined threshold value.

18. The one or more non-transitory computer readable media of claim 17, wherein the one or more processors are caused to perform further operations comprising:

comparing the ratio of physical pixels to device-independent pixels of a display of the user device.

19. The one or more non-transitory computer readable media of claim 18, wherein the one or more processors are caused to perform further operations comprising:

determining, based on the comparison, that the ratio of physical pixels to device-independent pixels of the display of the user device is less than the predetermined threshold value; and providing, to the user device, the file containing instructions and the selected image.

20. The one or more non-transitory computer readable media of claim 18, wherein the one or more processors are caused to perform further operations comprising:

determining, based on the comparison, that the ratio of physical pixels to device-independent pixels of the display of the user device is equal to or greater than the predetermined threshold value; and providing, to the user device, the file containing instructions and the other version of the selected image.

* * * * *